US006662181B1

United States Patent
Icken et al.

(10) Patent No.: US 6,662,181 B1
(45) Date of Patent: Dec. 9, 2003

(54) MECHANISM FOR SELECTION USING ACCESS CONTROL STRUCTURES FOR AUTHORING SYSTEMS

(75) Inventors: Donald A. Icken, Carmel, NY (US); Neal M. Keller, Somers, NY (US); Lisa M. Ungar, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,409

(22) Filed: May 8, 2000

(51) Int. Cl.[7] ............................................. G06F 17/30
(52) U.S. Cl. ......................................................... 707/9
(58) Field of Search .............................. 707/1, 3, 9, 10, 707/100, 104.1, 200, 201; 705/1; 709/200–205, 217–219; 345/700, 751, 753

(56) References Cited

U.S. PATENT DOCUMENTS

| | | | | | |
|---|---|---|---|---|---|
| 4,805,134 A | * | 2/1989 | Calo et al. | .................... | 707/10 |
| 5,278,979 A | * | 1/1994 | Foster et al. | ................. | 707/203 |
| 5,610,857 A | * | 3/1997 | Nandakumar | ................. | 257/31 |
| 5,953,718 A | * | 9/1999 | Wical | ............................ | 707/1 |
| 6,080,202 A | * | 6/2000 | Strickland et al. | .......... | 370/259 |
| 6,119,122 A | * | 9/2000 | Bunnell | ....................... | 707/102 |
| 6,163,785 A | * | 12/2000 | Carbonell et al. | ............. | 704/10 |
| 6,182,115 B1 | * | 1/2001 | Cuomo et al. | .............. | 709/204 |
| 6,182,140 B1 | * | 1/2001 | Feig et al. | .................. | 709/225 |
| 6,278,448 B1 | * | 8/2001 | Brown et al. | ............... | 345/866 |
| 6,314,409 B2 | * | 11/2001 | Schneck et al. | ............. | 380/259 |

* cited by examiner

*Primary Examiner*—Greta Robinson
*Assistant Examiner*—Harold E. Dodds, Jr.
(74) *Attorney, Agent, or Firm*—Scully, Scott, Murphy & Presser; Daniel P. Morris, Esq.

(57) ABSTRACT

The field of distributed authoring systems, and more particularly to the implementing of authoring controls within the authoring system. Moreover, there is provided a selection mechanism which employs control structures for dynamically selecting content and display components of an authoring system.

11 Claims, 5 Drawing Sheets

FIG. 3

| Uid | ACTIVE | ROLE |
|---|---|---|
| U$_1$ | | |
| U$_2$ | | |
| U$_3$ | | |

| CHOICE COMPONENT | ATTRIBUTE | WHICH DISPLAY COMPONENT |
|---|---|---|
| | | |
| | | |
| | | |
| | | |

— 26

MECHANISM FOR SELECTION USING ACCESS CONTROL STRUCTURES FOR AUTHORING SYSTEMS

BACKGROUND OF THE INVENTION

1. Field of the Invention

The present invention relates to the field of distributed authoring systems, and more particularly pertains to the implementing of authoring controls within the authoring system. Moreover, the invention is specifically directed to providing a selection mechanism which employs control structures for dynamically selecting content and display components of an authoring system.

In essence, authoring systems, which may also be known as authoring tools or authorware in technological and commercial applications, may be programs existing in hypertext and multimedia applications. Pursuant to more sophisticated applications,-in internet, on-line or CD-ROM programs, the authoring systems may be scripting language or graphics elements, or may even represent a mixture of textual (teaching tools, printed works and the like) material, graphical representations, audio data and numerous, practically unlimited types of objects or programs. These authorizing systems are ordinarily developed and designed by authors who define the relationships of the foregoing aspects with each other, and sequencing the programs in an appropriate order for data storage.

2. Discussion of the Prior Art

In the present state of the technology and industry, authoring systems are adapted to control authoring access, generally to an authoring system utilizing various control parameters such as check-in/check-out, access control lists, profiles and predefined roles which are assigned to various authors of the system.

In various of the presently developed and known authoring systems, the access control mechanisms which facilitate access to the authoring system are specified or predefined by the system itself; whereas, other authoring systems do not provide access control systems or similar arrangements.

SUMMARY OF THE INVENTION

In order to obviate and overcome the limitations encountered in present authoring systems a primary aspect of the present invention resides in the provision of an improved selection mechanism employed in authoring systems, which utilizes control structures for dynamically selecting content and display components present in the authoring systems. The authoring system incorporates an access control engine having the selection mechanism operatively connected therewith. An authoring control mechanism enables one or more users such as readers or authors to gain access to the authoring system, whereby multiple users may be afforded serial access the authoring system; or users may access the authoring system simultaneously or in an overlapping order in accordance with predetermined criteria or conditions established by the access control engine and enforced by the control mechanism for the authoring systems.

In essence, the authoring system utilizes different parameters or criteria in order to provide reader or author (user) access thereto through the improved access control engine pursuant to the invention. Basically, these parameters or criteria include:

a) Userid (User identification)—which is designed to uniquely identify a user or numbers of users intending to gain permission for access to the authoring system;

b) Active flag—providing for indication that a particular user is logged into the authoring system;

c) Role—is utilized to group users by related functionality, which is implemented by attributes, logic and values, as defined hereinbelow;

d) Attribute—is a named field which is associated with content, display components, and/other system elements; and is utilized to tag or impart a set of values with a specific meaning or meanings;

e) Logic—utilizes boolean logic in order to test a given value against the value of a corresponding in content, display component and/or other system element;

f) Value—defines a constant which is utilized in tabled logic, which is compared with corresponding constants which are assigned to content, display component or system element attributes;

g) Choice components—defines a list of that display component or those display components available to a role for both selection and display mechanisms, and which ties specific display logic to content attributes;

h) Which display component—list of which particular set of logic is to be used against the attribute in the display mechanism;

i) Permissions—to implement the "access authority of the system" for a specific role as set forth in c) hereinabove.

The foregoing parameters or criteria are employed in that the access control engine pursuant to the invention resolves access control or privileges in the authoring system, utilizing information from both an active user table and an access control structure table. In that instance, the roles are a membership structure utilized to group common functionality and to tie logic to attributes and values. Thus, the roles set forth in an access control table eliminate the need for author profiles in the authoring system, and by introducing logic and display components in the access control engine it is possible to obviate the need for having to execute logic subsequently, as do databases with their views. In the present authoring system, there is no distinction between authors and readers, and a person designed to multiple roles is imparted the combined functionality of all of the roles. Hereby, functionality is defined by the attributes, logic and values, and wherein every access is conveyed to the inventive access control engine, imparting the authoring system with the ability to dynamically reflect changes in the system.

Inventively, the selection mechanism is used to select both content and display components based on resolved control structures sent by the access control engine. The initiating service request to the access control engine is associated with a userid. Once the userid is associated with a role or roles, the userid is no longer needed for processing. Each role is associated with attributes, values and logic used to control content selection and how the selected content is displayed. The access control engine resolves overlapping and conflicting role logic and returns a single consistent set of logic to the selection mechanism. The selection mechanism uses this logic to select the content and display components. By introducing logic and display components in the access control engine, we do not need to have to execute logic later as databases do with their views.

Accordingly, it is an object of the present invention to provide an improved and novel selection mechanism which employs control structures to dynamically select content and display components in an authoring system.

A further object of the present invention resides in the provision of an authoring system which includes an access control engine incorporating a novel selecting mechanism for dynamically selecting content and display components of the authoring system through the use of control structures.

BRIEF DESCRIPTION OF THE DRAWINGS

Reference may now be had to the following detailed description of a preferred embodiment of selection mechanism in an authoring system pursuant to the invention, taken in conjunction with the accompanying drawings; in which:

FIG. 3 illustrates an active user (multiuser) table;

FIG. 4 illustrates a display component table;

DETAILED DESCRIPTION OF A PREFERRED EMBODIMENT

Figure 1:
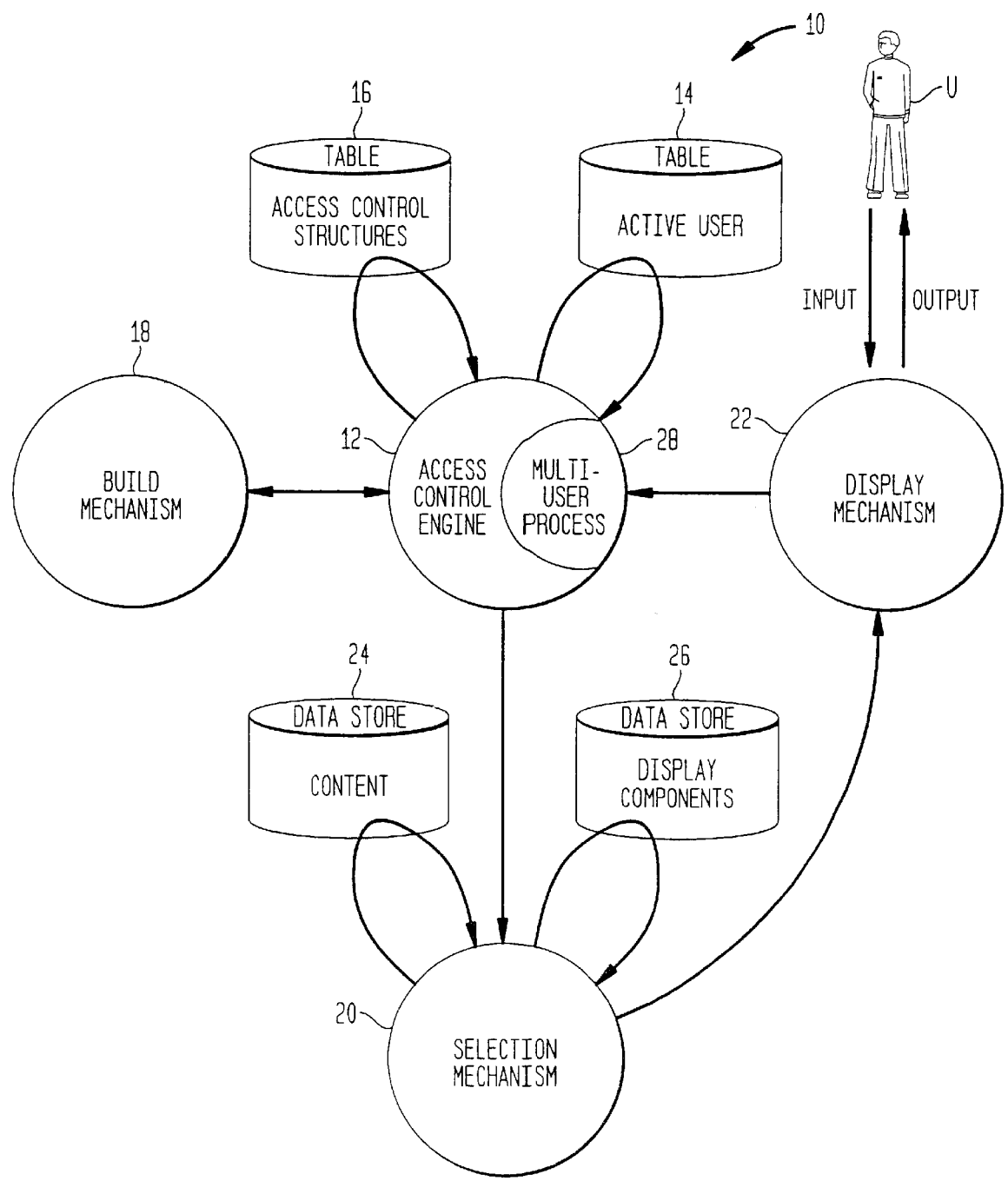
FIG. 1 illustrates in a generally diagrammatic representation, an authoring system including selection mechanism which is operatively integrated with other components of the system pursuant to the invention.

Referring in detail to the drawings, and particularly FIG. 1, there is illustrated an authoring system 10 including an access control engine 12. The access control engine 12 resolves access control or privileges imparted to a user or plurality of users in the authoring system, utilizing information data, from both an active user table 14 and an access control structure table 16, and with the data flow represented by the arrows shown between the components 12 and 14, and respectively, components 12 and 16 of the authoring system 10.

A build mechanism 18 provides for appropriate variable data information and instructions to be imparted to and exchanged with the access control engine 12 from an external source, and is adapted to introduce logic and display components into the access control engine.

Figure 2:
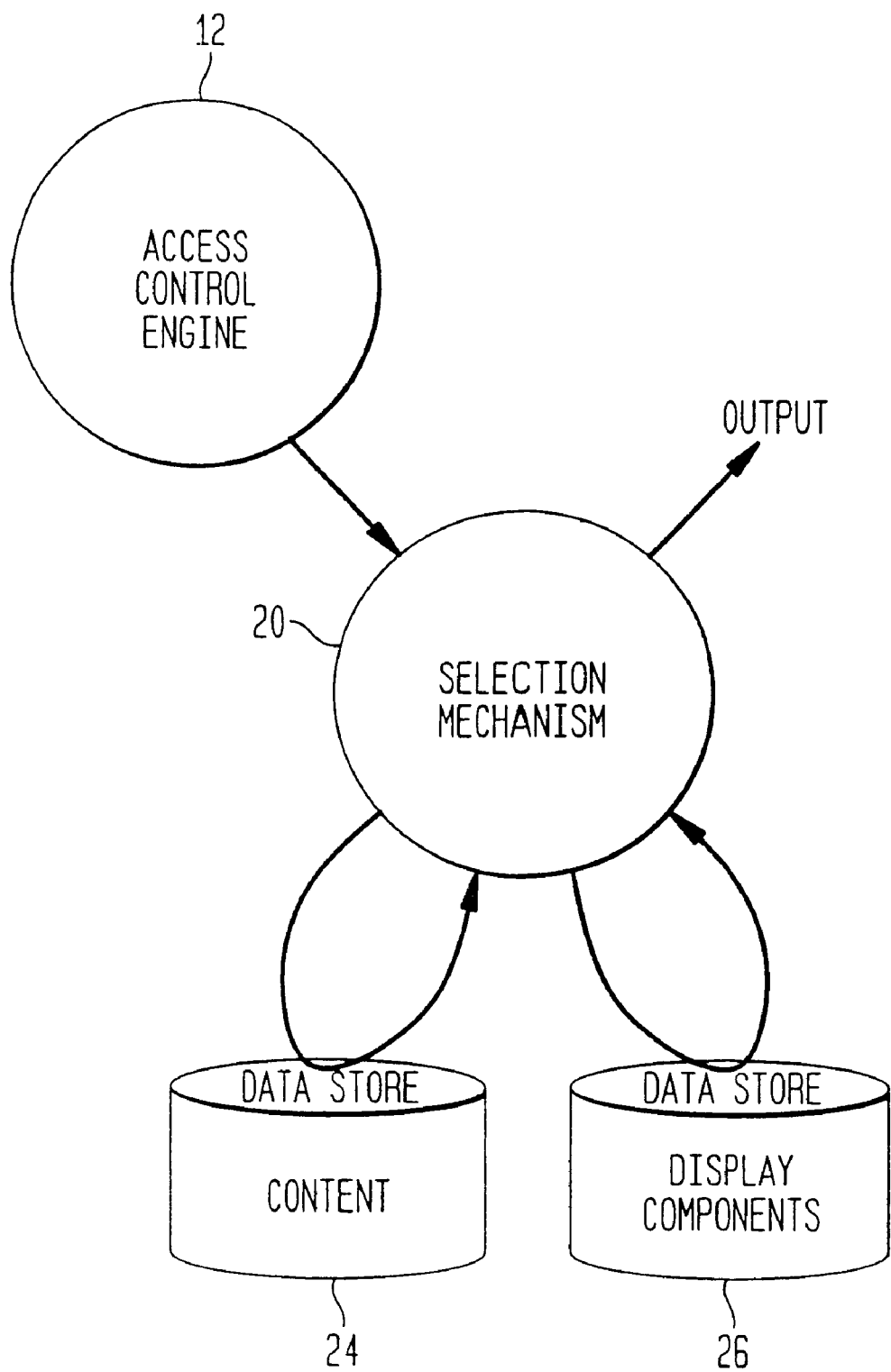
FIG. 2 illustrates the selection mechanism using access control structures for dynamically selecting content and display components of the system.

A novel selection mechanism 20, as discussed hereinbelow and as shown in FIG. 2, derives appropriate information, for subsequent transmission to a display mechanism 22, from a data store 24 having attribute contents stored therein, and from a further data store 26 having display components stored therein for selectively relaying the foregoing data to the display mechanism 22. The latter conveys displaying information to a multi-user processing system 28 in the access control engine 12.

Thus, as shown in particular, through the Active User Table 14 shown in FIG. 3, a user (i.e. reader, author) U may be assigned an active status by setting an Active Flag, indicating that the user has been logged into the authoring system 10 responsive to the Userid (User identification) assigned to the user.

The foregoing user assignment, as shown in the table 14 in FIG. 3, may be for any number of users $U_1, U_2, - - - U_x$, who may be assigned different roles imparting access to the authoring system 10, which may be used to group users by related functionality, as defined by attributes, logic and values. Thus, the active user table 14 which identifies the Userid, Active Flag and Role, leads to boolean logic to test a given value against a corresponding Attribute value in the content, display component and/or other authoring system constituents. The role assigned to a particular user may be predetermined by the data supplied to the access control engine 12 by the build mechanism 18, so as to impart to the user specific types of authorities, such as being capable of only reading the author material, or editing the author material at any particular site or sites.

Moreover, by way of example a user or users or may be imparted further roles enabling him or them to access author material at different geographic locations; for instance, a user in New York may be empowered to gain access to author material in New York, Chicago or Los Angeles. Moreover, the user may possibly be empowered to only "read" material in Chicago and Los Angeles, while being able to "edit" the author material in New York, although numerous permutations and different attributes may be assigned to any particular user or users at any specific location or locations in accordance with data supplied to the active user table 14 from the access control engine 12.

As illustrated in FIG. 1 of the drawings, the access control structure table 16 assigns to the particular user or users a role, various attributes, (boolean) logic values, choice components and permission for accessing which define the different types of access the user may have by means of the access control engine 12, wherein the table contains the foregoing information which has been imparted thereto through the access control engine 12 by data from the build mechanism 18, which was imputted from an external source or authority. In that instance, the build mechanism 18 assembles or builds the informative/data elements which are needed by the access control engine 12 to provide the required information and criteria to the remaining operative components of the authoring system 10. The selection mechanism 20, in turn, selects the content and display components based on information which is provided thereto by the access control engine 12. In turn, the display mechanism 22 builds or formulates a display, as may be shown the Display Component Table of FIG. 4, which is based on information provided thereto by the selection mechanism 20. The multi-user process 28 of the authoring system utilizes the access control engine 12 in order to determine the relationship between the multiple authors to which access is to be gained.

Figure 5:
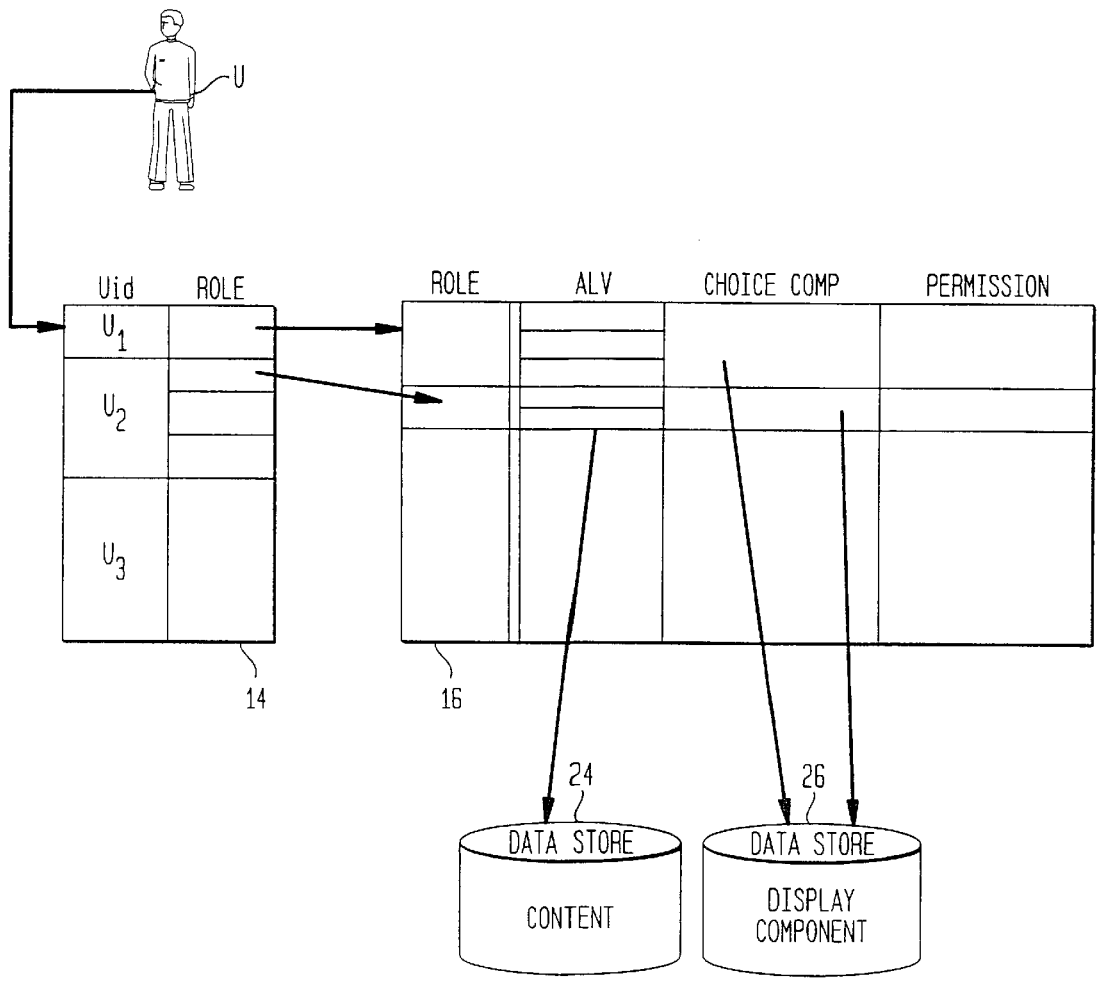
FIG. 5 illustrates a data flow scenario effected with the selection mechanism of the invention.

As shown in FIG. 5 of the drawings, representing data flow obtained with the selection mechanism 20, the user provides data through the selection mechanism which is represented in the active user table, wherein the role which is assigned to the user is represented, subsequent to approval of the user identification. The data is then transmitted to the access control structure wherein the roles assigned to the user are represented and the attributes and logic values are transmitted to the content data store, whereas the choice components are transmitted to the display component data store, upon permission particular access being represented in the access control structure table.

Figure 6:
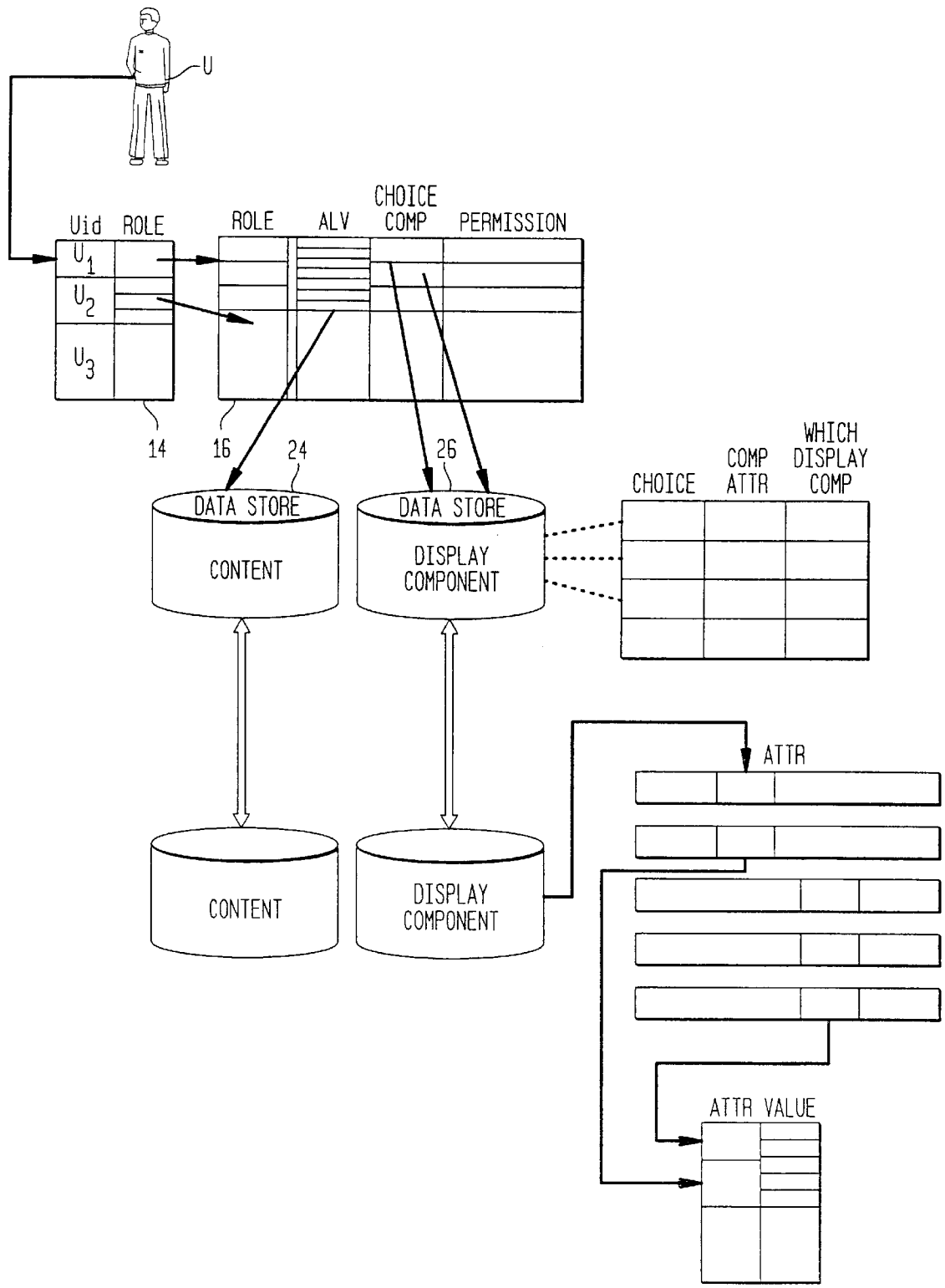
FIG. 6 illustrates a data flow scenario representation of the relationship between the selection mechanism and display mechanism.

As illustrated in FIG. 6 of the drawing representing the relationship between the selection mechanism 20 and the display mechanism 22, again, the user inputs data as shown in the active user table which is then transmitted to the access control structure representing the role assigned to the particular user, the attribute and logic value being conveyed to the data store for the content, and the choice components to the data store for the display components.

The display components are then represented in the display component table, as shown in FIG. 4 of the drawings, setting forth the choice components the attributes and which display components is to be represented on the display, whereas further data is transmitted from the content data store to a subset of contents; and the contents of the display components from the data store thereof to a subset of the display components. These in turn are then represented in a temporary attribute and value table.

The foregoing provides a simple and readily implemented dynamically selected content and display components mechanism employing the novel selection mechanism 20 pursuant to the invention.

Reverting to a typical scenario in the application of the authoring system 10 through intermediary of the inventive selection mechanism 20, the following process flow thereof is set forth hereinbelow:

Step 1) The selection mechanism shown in FIG. 1 receives information from the access control engine 12 which had previously received a service request;

Step 2) The selection mechanism, based on information received in Step 1), accesses the content data store to select relevant content;

Step 3) The selected content from Step 2) is returned to the requesting service;

Step 4) The selection mechanism, based on the information received in Step 1), accesses the display components table of FIG. 4, and selects the relevant display components;

Step 5) The selected display components from Step 4) are returned to the requesting service.

While the invention has been particularly shown and described with respect to preferred embodiments thereof, it will be understood by those skilled in the art that the foregoing and other changes in form and details may be made therein without departing form the spirit and scope of the invention.

What is claimed is:

1. An authoring system including mechanisms for enforcing authoring controls so as to selectively impart access to one or more authors to said authoring system predicated on specific criteria, said system comprising:

a) an access control engine wherein boolean logic changes dynamically in response to multiple roles and existing attributes and values to enable a single pass access;

b) a build mechanism operatively connected which connects to said access control engine for the purpose of building customized roles, attributes and logic which comprise the control elements required by the selection mechanism of said engine; and c) a selection mechanism which uses dynamic boolean logic combined with the control structures, the relationship of one or more roles, and the state of the other parts of the authoring system to select content and display components.

2. An authoring system as in claim 1, wherein roles interact with control structures, existing relationships with other authors and boolean logic to generate dynamic selections of content and display components.

3. An authoring system as in claim 2, wherein a single role or multiple roles are affiliated with one or more authors and attributes.

4. An authoring system as in claim 1, wherein the boolean logic changes dynamically in response to multiple roles and existing attributes and values to enable a single pass access to content and display components.

5. An authoring system as in claim 1, wherein single or multiple attributes with one or more values are names associated with content, display components, roles and control structures for customized access.

6. A method of utilizing an authoring system including mechanisms for enforcing authoring controls so as to selectively impart access to one or more authors to said authoring system predicated on specific criteria, said method comprising:

a) an access control engine wherein boolean logic changes dynamically in response to multiple roles and existing attributes and values to enable single pass access;

b) a build mechanism operatively connected which connects to said access control engine for the purpose of building customized roles, attributes and logic which comprise the control elements required by the selection mechanism of said engine; and c) a selection mechanism which uses dynamic boolean logic combined with the control structures, the relationship of one or more roles, and the state of the other parts of the authoring system to select content and display components.

7. A method as claimed in claim 6, wherein roles interact with control structures, existing relationships with other authors and boolean logic to generate dynamic selection of content and display components.

8. A method as claimed in claim 7, wherein a single role or multiple roles are affiliated with one or more authors and attributes.

9. A method as claimed in claim 6, wherein the boolean logic changes dynamically in response to multiple roles and existing attributes and values to enable a single pass access to content and display components.

10. A method as claimed in claim 6, wherein single or multiple attributes with one or more values are names associated with content, display components, roles and control structures for customized access.

11. A program storage device readable by machine tangibly embodying a program of instructions executable by machine to perform a method for an authoring system including mechanisms for enforcing authoring controls so as to selectively impart access to one or more authors to said authoring system predicated on specific criteria, said method comprising:

a) providing an access control engine wherein boolean logic changes dynamically in response to multiple roles and existing attributes and values to enable single pass access b) having a build mechanism operatively connected which connects to said access control engine for the purpose of building customized roles, attributes and logic which comprises the control elements required by the selection mechanism of said engine; and c) having a selection mechanism which uses dynamic boolean logic combined with the control structures, the relationship of one or more roles, and the state of the other parts of the authoring system to select content and display components.

* * * * *